Patented Oct. 27, 1936

2,058,475

UNITED STATES PATENT OFFICE 2,058,475

SYNTHETIC RESINS

Karl Loos, Astoria, N. Y., assignor of fifteen one-hundredths to Joseph Hirschman, New York, N. Y.

No Drawing. Application May 20, 1930, Serial No. 454,198

3 Claims. (Cl. 260—4)

My invention relates to synthetic resins and more particularly to resins of the phenol formaldehyde type and has for one of its objects to provide a resin of this kind, which is very strong and tough, is non-brittle, and can be easily machined.

It is also an object of the invention to provide a resin of the kind indicated which is light in color but in which there may be incorporated various coloring materials.

It is a further object of the invention to provide a method of producing synthetic resins of extraordinary transparency.

Other objects will appear from the following description and the features of novelty will be pointed out in the appended claims.

The production of synthetic resins from a phenol and an aldehyde, such as phenol or cresol and formaldehyde, is well understood in the art. It is also known to produce more or less clear resins with the aid of acidic catalysts but the products obtained by such processes are generally brittle and difficult to machine. When solid basic catalysts are employed the difficulty arises that the material obtained is cloudy or translucent, it being extremely difficult to obtain clear transparent resins with such catalysts. This undesirable result is probably due to traces of water which remain in the final resin and are difficult to remove.

I have found that the last traces of water can be comparatively easily removed from a phenol formaldehyde resin formed in the presence of a basic catalyst, such as sodium or potassium hydroxide, by adding to the resin in the fusible, soluble state a material of high boiling point, which acts as a plasticizer and delays the final hardening of the resin, so that the fusible resin may be heated for a long time until all of the water has been driven out without reaching a highly viscous or infusible state. This added material should preferably have a boiling point much above the boiling point of water, should be insoluble in water or nearly so, and should be compatible with the resin, i. e. will mix therewith uniformly in the proportions employed and will produce no precipitation or cloudiness. This material should also be of such character that it will not cause the final product to be brittle. As such added material I have found glycerol tri-acetate to be highly satisfactory. This compound acts as a plasticizer or softener for the resin and permits a the resin to be heated for a long time without hardening so that the last remaining traces of water can be expelled.

The plasticizer acts to keep the intermediate, potentially reactive condensate in a fluid and mobile condition for a longer period of time during the distillation and imparts toughness to the final product irrespective of the proportion of formaldehyde employed. The complete removal of the last traces of water can be conveniently effected only when smaller (i. e. approximately stoichiometric) quantities of formaldehyde are used, such proportion being employed when a transparent product is to be obtained. For non-transparent material, for which an excess of formaldehyde is used, complete removal of the moisture is unnecessary.

In accordance with the present invention I may produce tough, non-brittle, easily machinable resins which are either transparent or partially or completely opaque. To produce the clear transparent resin I may proceed as follows: Phenol and formaldehyde are condensed, in approximately stoichiometric proportions, in known manner, either potassium or sodium hydroxide being employed as a catalyst, until a fusible, soluble intermediate resin is obtained. The resin is then heated to distil off as much water as possible, after which the mass is partially neutralized. The resin may now be again heated to drive off more of the water, after which I add a quantity of glycerol tri-acetate to the resin; or else, I may add the glycerol tri-acetate immediately after the partial neutralization without the preliminary distillation. After the addition of the glycerol ester the mass is again distilled either on a water or oil bath, by direct flame, or in a steam jacketed kettle, or in any other suitable manner, preferably not over 115° C. and under vacuum. During this distillation the last traces of water, and also any excess phenol, are driven off. The glycerol tri-acetate keeps the material soft and fluent and permits heating thereof for a longer period of time without causing hardening of the resin and so ensures complete elimination of the water. The dry resin may be hardened in molds and generally requires a little longer time for the hardening than known synthetic resins composed only of phenol and formaldehyde.

The neutralization is preferably effected by means of an organic acid, preferably an unsulfonated acid, such as lactic, acetic, benzoic, salicylic, malic, etc. Inorganic acids are generally undesirable because they tend to make the final product brittle. As the catalyst is non-volatile the reacting ingredients may be heated in an open vessel with or without a reflux.

To produce translucent or opaque material I employ a larger proportion of formaldehyde and a larger quantity of catalyst. For such material I may also use sodium and potassium carbonates as the catalyst. The same acids may be used for the neutralization as are employed in the production of the transparent resin and in addition tartaric acid may be employed, while neutralization is carried to completion and even to the point where an excess of acid of 1% by weight is present.

In order that my invention may be better understood I shall describe two modes of carrying out the same. It will be understood that the examples are given by way of illustration only and are not to be taken in a limiting sense.

Example 1

For a clear, light colored resin, the following materials are employed, the parts being by weight:

|   | Parts |
| --- | --- |
| Phenol | 100 |
| Formaldehyde (approximately 40% solution) | 80 |
| KOH or NaOH | 0.5 |

In place of the phenol, cresol may be used or a mixture of phenols may be employed. The mixture of the reacting compounds is heated for about 2 hours at about 95 to 100° C. in known manner to produce the fusible, soluble, resinous condensate. This condensate is preferably now heated in any known manner to drive off part of the water, the temperature being permitted to rise to about 65 to 70° C., preferably with the use of vacuum. The fusible resin is then partially neutralized with such a quantity of an organic acid (such as lactic, acetic, benzoic, salicylic, malic, etc.) until approximately 0.2% by weight of the catalyst, based upon the amount of material then present, remains in the free condition. This partially neutralized mass can now be heated to distil off as much as possible of the water, after which there are added 5 to 15% of glycerol tri-acetate, based upon the weight of resinous condensate, and the mass then distilled up to about 95 to 115° C. until practically the last traces of moisture have been removed. If the mass has been heated to the lower temperature, it may then be poured directly into moulds; while if it has been heated to higher temperatures (115° C. or thereabouts), it is preferable first to cool the same. The material so produced may be hardened at about 75° to 110° C. or higher. The product so obtained is highly transparent, tough, non-brittle, and can be easily machined.

Example 2

For preparing a translucent, cloudy or opaque material, which in other respects has substantially the same properties as the material produced according to Example 1, I may proceed as follows all parts being by weight:

| Phenol | parts | 100 |
| --- | --- | --- |
| Formaldehyde (40% solution) | do | 140–250 |
| KOH or NaOH | per cent | 2–4 | are caused to react in known manner to produce the fusible, soluble, intermediate condensation product. In place of the hydroxides I may use also the corresponding carbonates in equivalent amounts. The mass, which is in a potentially reactive state, is then carefully distilled, preferably under a vacuum, up to 60–65° C. The mass is then completely neutralized with any of the above-mentioned acids, including tartaric acid. A slight excess of acid, say 1% by weight, may be employed for producing translucent or cloudy material. Where opaque products are desired, a greater amount of free acid, up to about 20–25% (or more, particularly when a carbonate is used as catalyst) in excess of that required to effect neutralization, may be employed. The resinous mass may then be distilled to drive off part of its moisture, after which 5–20% by weight of glycerol tri-acetate is mixed into the mass. The mixture is then heated up to about 96–99° C. until at least the major portion of moisture has been driven off. The resin may then be poured into moulds and hardened in the usual manner.

While I have specifically described the use of glycerol tri-acetate, it is to be understood that other substances having the properties of this ester, namely, nearly complete or complete insolubility in water, high boiling point, compatibility with the phenol-formaldehyde resin and the ability to render such resin fluent without at the same time making the final solid product brittle, may be used and that I regard as within the scope of my invention the use of a substance having such properties with a phenol-formaldehyde resin for the purposes described. In general, nearly or completely water-insoluble, high boiling, glycerol esters of aliphatic acids of low molecular weight are to be preferred. For neutralizing the catalyst, I prefer to use acetic acid.

The substantially complete removal of the moisture is essential only when a transparent product is desired in which case, as indicated in Example 1, substantially stoichiometric quantities of phenol and formaldehyde are employed. For obtaining the non-transparent product, the substantially complete removal of the moisture is not so essential and is, in fact, harder to accomplish because of the presence of an excess of formaldehyde, as indicated in Example 2. In both cases, however, the plasticizer aids in producing a strong, tough, non-brittle, easily machinable material.

It is preferable, in producing the transparent material, to employ a plasticizer or fluidizer whose boiling point is above that of the particular phenol or phenols used in the reaction, so that any excess phenol may be expelled during the distillation. As indicated above, the plasticizer arrests the final hardening of the resin and also imparts toughness thereto.

Variations from the specific proportions, temperatures, etc., specified herein may be resorted to within the scope of the appended claims without departing from the spirit of the invention.

I claim:

1. The method of producing transparent tough, easily machinable resins, which comprises heating approximately equimolecular quantities of phenol and formaldehyde in the presence of approximately 0.5% (based on the weight of phenol) of a solid alkaline hydroxide until the fusible intermediate condensate is produced, distilling off part of the water, partially neutralizing the mass with an unsubstituted aliphatic acid until only approximately 0.2% of alkali (based on the weight of the condensate) is present, adding 5–15% glycerol tri-acetate (based on the weight of the condensate), further heating the mass until the last traces of water have been substantially completely removed, and subsequently heating the mass to harden the same.

2. In a process for producing substantially insoluble, infusible, transparent, tough, easily machinable resins, the steps which comprise heating a phenol and formaldehyde in the presence of a basic catalyst until the fusible intermediate condensate is produced, distilling off part of the water, at least partially neutralizing the catalyst with an unsubstituted aliphatic acid, adding approximately 5-20% of glycerol tri-acetate (based on the weight of the condensate), and further heating the mass to drive off more of the water.

3. The method of producing transparent, tough, easily machinable resins, which comprises heating approximately equimolecular quantities of phenol and formaldehyde in the presence of an alkali metal hydroxide until the fusible intermediate condensate is produced, distilling off part of the water, partially neutralizing the mass with an acid of the group consisting of acetic and lactic acids to reduce the alkalinity of the mixture and then further heating the mass in the presence of glycerol tri-acetate until the free water has been substantially completely removed, and subsequently heating the mass to harden the same.

KARL LOOS.